Figure 1:
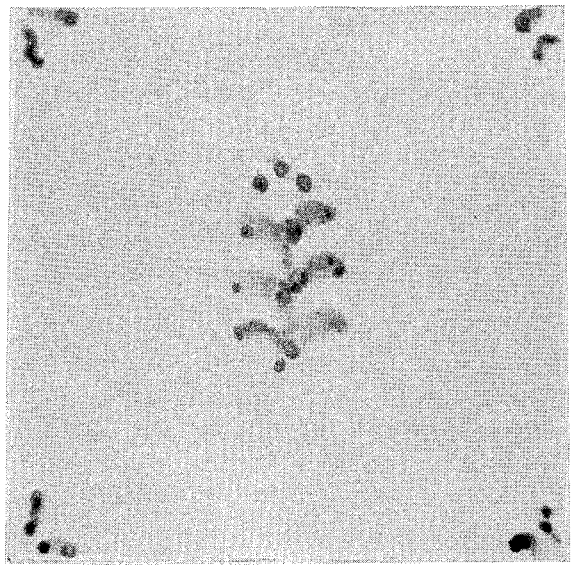

3,211,575
GLAZED CERAMIC ARTICLES
Henry S. Bondi, New York, N.Y., assignor, by mesne assignments, to FMC Corporation, San Jose, Calif., a corporation of Delaware
Filed Mar. 14, 1962, Ser. No. 179,761
13 Claims. (Cl. 117—125)

This invention relates to coated ceramic products, and more particularly to ceramic products having improved and extremely adherent protective and/or decorative glazed surfaces.

Broadly, the teachings of the present invention are applicable to providing ceramic articles with glazed surfaces which serve primarily as protective coatings. From a more comprehensive standpoint, and as hereafter described, the invention is especially useful in providing ceramic articles with protective glazed surfaces and, in addition, an overglaze applied in the form of a decorative or descriptive design. The terms "ceramic products" and "ceramic articles" as employed throughout the description and claims is intended to include all ceramic articles having protective and/or decorative glazed surfaces, regardless of the aesthetic and/or functional purposes served by such ceramic articles. From the standpoint of simplicity and ease of description, however, the invention is hereafter described as employed in the manufacture of clay tiles having a protective glazed surface decorated with an overglaze.

In the conventional manufacture of decorative ceramic tile, for example, at least one surface of a bisque-fired or uncoated, baked clay tile is covered with a glaze slip onto which a decorative design may be applied using a second glaze slip. The coated tile is then fired at relatively high temperatures within a kiln and tempered by being cooled slowly.

In its uncoated condition, the baked clay tile is rather porous and thus has a marked tendency to absorb moisture from the glaze slip which is initially applied. Excessive loss of such moisture leaves the glaze slip comparatively dry and contributes to improper bonding between the tile and the resulting glazed surface. On the other hand, a glaze slip which is too fluid facilitates separation of the glaze constituents and flows over sides of the tile itself, thus providing a glazed surface which is non-uniform and perhaps of a thickness less than desired.

Often organic binders, such as glue, gum, tragacanth, dextrine and gelatine, are added to the glaze slip to hold the glaze in a colloidal or suspended state, to prevent the glaze from fluffing or chipping off and, in effect, assist in controlling the glaze consistency. Methyl cellulose has also been frequently employed as a binder. Glaze slips containing methyl cellulose increase in viscosity when heated and gel at temperatures of from about 180° to 210° F. However, when subjected to more elevated temperatures, as encountered during firing, such glaze slips tend to foam and, more important, become less viscous and thus flow or run before the methyl cellulose is actually burned-away. The disadvantages of using methyl cellulose as a binder for the glaze ingredients become more apparent when the glaze slip is decorated with an overglaze and then fired. In this instance, the resulting glazed surface is generally variegated and exhibits, at most, only a vague or blurred and distorted image of the decorative design originally applied. Accordingly, a primary object of this invention is to provide a generally new or improved and more satisfactory composition and method for providing ceramic products with protective and/or decorative glazed surfaces.

Another object is the provision of a composition and improved method for providing ceramic products with adherent glazed surfaces which are generally free of crazing.

Still another object of this invention is the provision of a composition and improved method for providing ceramic products having distinct or sharp decorative designs.

These and other objects and advantages of this invention will become more apparent from the description and claims which follow.

The present invention is based upon the discovery that an aqueous dispersion of cellulose crystallite aggregates having a level-off D.P. may be added to conventional ceramic glaze compositions and, when applied to dry uncoated ceramic articles, readily gel and form a highly adherent and continuous coating which is receptive to oveglaze materials.

Cellulose crystallite aggregates are acid-insoluble products produced by a controlled acid hydrolysis of cellulose and their having a level-off D.P. reflects a destruction of the original fibrous structure of the cellulosic source material. The term "level-off D.P." has reference to the average level-off degree of polymerization measured in accordance with the paper by O. A. Battista entitled "Hydrolysis and Crystallization of Cellulose," vol. 42, Industrial and Engineering Chemistry, pages 502–7 (1950). A method of forming cellulose crystallite aggregates having a level-off D.P. and a method of disintegrating the aggregates to reduce a mass of aggregates to a colloid-forming size are described in United States Patent 2,978,446, dated April 4, 1961.

As described in the aforementioned patent, a cellulose material is subjected to a controlled acid hydrolysis to dissolve amorphous forms of cellulose leaving as a residue cellulose crystallite aggregates. The cellulose is subjected to the hydrolysis treatment for a time and at a temperature sufficient to disrupt the continuity of the fine structure. One such method comprises treating the cellulose with a 2.5 normal hydrochloric acid solution for 15 minutes at the boiling temperature of the solution. Another suitable method involves treating the cellulose with a 0.14 normal (0.5%) hydrochloric acid solution at 121° C. under pressure for 1 hour. In accordance with the method as described in the aforementioned patent, the insoluble residue is preferably washed free of acid.

The cellulose crystallite aggregates which are recovered from the hydrolysis treatment have a particle size in the range of from less than 1 micron to about 300 microns as determined visibly by microscopic examination and may be designated as "as-formed cellulose crystallite aggregates." As described in the aforementioned patent, by subjecting a mass of crystallite aggregates to a mechanical disintegration so as to produce a mass of disintegrated aggregates wherein at least about 1% of the cellulose crystallite aggregates, by weight, have a particle size less than about 1 micron, the disintegrated mass is capable of being colloidally suspended in aqueous media; that is, the mass is characterized by forming a stable suspension in aqueous media.

Following mechanical disintegration, the aggregates may be dried, preferably by spray drying at low temperatures either in air or a vacuum to thus provide a free flowing powder which is generally free of agglomerated particles.

The average level-off D.P. of the cellulose is in the range of about 15 to about 375 anhydroglucose units. The specific average D.P. (degree of polymerization) is dependent primarily upon the specific cellulosic raw material.

The mechanically disintegrated aggregates may be dispersed in an aqueous medium having a pH not greater than about 11 to form a colloidal dispersion. The dispersion is stable in the aqueous medium having a pH from about pH 7 to a pH of about pH 11 and may exhibit an appearance which varies from a slight or somewhat opalescent cast to a thick creamy paste or thixotropic gel depending upon the concentrations and particle size of the cellulose crystallites in the aqueous medium. In general, dispersions containing about 3% or more, by weight, of the level-off D.P. cellulose or dispersed cellulose crystallites exhibit thixotropic properties while those containing lesser proportions of the cellulose exhibit a milky appearance or a slight opalescent appearance again depending upon the amount and size of dispersed cellulose. The mechanical disintegration breaks up the aggregates into some particles of less than one micron in size although some of the particles appear to be as large as 200 and 300 microns in size.

In preparing glazes for use in the present invention, cellulose crystallite aggregates are intermixed or blended with known glaze formulations or compositions in much the same manner as and in lieu of organic binders conventionally employed. The cellulose crystallite aggregates added to the glaze formulation may be in their never-dried condition; that is, as obtained after being mechanically disintegrated or as a dispersion which may take the form of a paste, gel, or flowable solution, with the water carried by such aggregates substituting for at least a portion of the water which is usually necessary for plasticizing the normally dry glaze mixtures. Alternatively, water may be added to and blended with dry cellulose crystallite aggregates to provide a slurry which may be then mixed with the desired glaze formulation.

The present invention is not concerned with any particular glaze formulations but instead is applicable to the manufacture of glazed ceramic products using any glaze formulation in which an organic binding material is or proves useful. Conventional glaze formulations are, of course, varied to achieve glazed surfaces having desired physical and/or optical characteristics, as for example, finish, fluid impermeability, translucency, etc., and may also contain various stains or metallic oxides to effect desired coloring in the case of decorative or ornamental products. The amount of cellulose crystallite aggregates which is necessary will thus differ from one glaze formulation to another as well as with the variation made to any one particular glaze formulation. The cellulose crystallite aggregates should be present in an amount sufficient to insure proper binding of the constituents or ingredients of the glaze formation but not in such an amount that insufficient glaze will be present for the particularly coating desired. Usually the cellulose crystallite aggregates will constitute a minor constituent of the glaze slip as compared with the amounts of water and glaze ingredients which are present.

Glaze slips slurries or englobe containing cellulose crystallite aggregates and prepared as described above may be applied to uncoated ceramic articles in a conventional manner, as by dripping, spraying or brushing. The uncoated ceramic articles themselves may be in dry but unbaked condition or may have been previously fired. In the practice of the invention, as for example in the manufacture of ceramic tile having only one glazed surface, a glaze slip prepared as described above may be first brushed onto one surface of a dry bisque or uncoated, baked clay tile which had been formed by conventional procedures. As heretofore mentioned, such uncoated tiles are porous and thus readily absorb large amounts of water from the applied glaze slip. With a glaze slip as described above, however, the contained cellulose crystallite aggregates have an affinity for and are capable of retaining water so that uncoated tile absorbs only excess water, leaving a uniform gel or colloidal dispersion of glaze and cellulose crystallite aggregates deposited on the tile surface.

At this stage, the glaze particles appear suspended within and adhered to the gel formed by the cellulose crystallite aggregates and are thus retained in somewhat fixed positions. The coated tile may be fired in a conventional manner, or alternatively, an overglaze slurry or slip may be brushed onto the glaze slip which was initially applied to provide a desired decorative design and then followed by firing. The overglaze slurry or slip may be and preferably is prepared using cellulose crystallite aggregates, as described above, to thus insure proper suspension and fixation of the glaze particles as a result of the gelling action induced by the contained cellulose crystallite aggregates.

The temperature at which the glaze coated tile is fired as well as the duration of firing of course will vary with the particular glaze or glazes employed, as well as the clay of the tile itself. As with conventional procedures, the glazed tile is tempered by being allowed to cool slowly within the firing kiln.

As evidenced by glazed tile formed in accordance with the present invention, the gels formed by the cellulose crystallite aggregates do not collapse or become less viscous when heated during the firing stage, as is occasioned when using methyl cellulose as a glaze binder. Apparent flow of either of the applied glaze slips or slurries is therefore absent during the firing stage, with the result that the decorative designs formed by the different glaze slips are free of blurring and/or distortion. As with organic binding materials commonly employed, the crystallite aggregates burn-off during the firing stage but without creating any bubbling or foaming of the glaze, as is occasioned when methyl cellulose is present. In view of the tendency for the glaze slips or slurries of the present invention to rapidly gel when applied to the uncoated tile surface, the cellulose crystallite aggregates remain well dispersed and, when burned-off, insure the formation of glazed surfaces which are smooth and of substantially uniform texture. Of further importance is that the glazed surfaces of ceramic products produced in accordance with the present invention are free of peeling and exhibit no crazing, thus indicating that the incorporation of cellulose crystallite aggregates has no detrimental effects upon the shrinkage characteristics of the glazes employed and apparently contributes to the formation of a more tenacious bond between the glazes and tile.

As heretofore mentioned, the teachings of the present invention are applicable to glazing of both baked or bisque and as well as unbaked but dry ceramic products. Further, firing of the initially applied slip glaze and overglaze may be accomplished simultaneously, as described above, or separately with equally satisfactory results.

The invention may be further illustrated by the following example:

An aqueous dispersion of cellulose crystallite aggregates was prepared by first forming a 10% by weight suspension of aggregates, as obtained from the acid hydrolysis and water washing steps, in water. The aggregates had an average level-off D.P. of 220 and were in the spray dried state prior to making up the suspension. In the spray dried state, the aggregates are white in color. The suspension was then mechanically desintegrated in an Osterizer Blender for 15 minutes, providing a slurry which flowed readily and contained 10% by weight of aggregates having a particle size ranging from less than 1 to about 250 to 300 microns.

Conventional ceramic glazes, as described in "A Book of Pottery: Mud into Immortality" by Henry Poore, published by Prentice-Hall Inc., Englewood Cliffs, New Jersey were prepared as follows, the amounts of ingredients being expressed as parts by weight.

I. Poore's clear raw lead glaze:
    White lead _____ 45.0
    Whiting _____ 3.0
    Feldspar _____ 15.0

| | |
|---|---|
| Kaolin | 4.0 |
| Flint | 9.0 |
| Cornwall stone | 4.0 |
| Zinc oxide | 1.0 |
| Tin oxide | 1.5 |

II. Poore's Alfred opaque white #101:

| | |
|---|---|
| Ferro frit #3124 [1] | 168.0 |
| Ferro frit #3496 [1] | 27.9 |
| White lead | 66.0 |
| Feldspar | 62.0 |
| China clay | 24.6 |
| Flint | 32.17 |
| Whiting | 6.0 |
| Bentonite | 11.5 |
| Tin oxide | 39.81 |
| Copper | Trace. |

[1] Available from Stewart Clay Corporation, 133 Mulberry Street, New York city, New York.

To a portion of the slurry of cellulose crystallite aggregates initially prepared was added 10% by weight of the dry glaze formulation denoted above as I, and with continued mixing, provided a glaze slip having a consistency similar to that of an oil base paint. Upon brushing of this glaze slip onto a surface of a conventional baked and dry but uncoated clay tile, excess water was rapidly absorbed by the porous tile leaving a uniform gel layer on the surface thereof. No flow of the glaze slip onto the sides of the tile was occasioned and the glaze particles appeared to adhere to the cellulose crystallite aggregates and were suspended within the gel itself.

In the same manner as described above, an overglaze was prepared using the remaining portion of the slurry of cellulose crystallite aggregates and 10% by weight of the glaze formulation identified above as II. The overglaze was applied onto the gel coated surface of the clay tile using a fine brush to provide a desired decorative design. The overglaze also formed into a gel with no intermixing or blurring of the slip glaze and overglaze being apparent. The tile was placed in a kiln, fired at 200° F. for a period of 3 hours, and then allowed to temper within the kiln overnight.

The resulting glazed tile, as illustrated in FIGURE 1 of the drawing, exhibited no blurring or distortion in the decorative designs provided by the overglaze thus indicating that the cellulose crystallite aggregates did not collapse or lose their gel forming characteristics during the initial stages of the firing step and before they were burned-off. Further, the uniformity in both texture and color of the surfaces formed by the respective glaze slips clearly showed that the cellulose crystallite aggregates were uniformly dispersed along the areas that were coated and burned-off completely during the firing step. Of still further significance is that the absence of peeling and crazing of the glazed surfaces indicated that a strong bond had been established between the separately applied glazes and the tile surface, and that the presence of the cellulose crystallite aggregates had no detrimental effect upon the glaze shrinkage characteristics.

For purposes of comparison, glazes I and II described above were separately mixed with water only, as in the conventional practice, to provide glaze slips of desired consistency. The respective glaze slips were applied to a conventional baked and dry but uncoated clay tile in the same manner and order as described above. The coated tile was then fired and tempered under the same conditions as described above.

Figure 2:
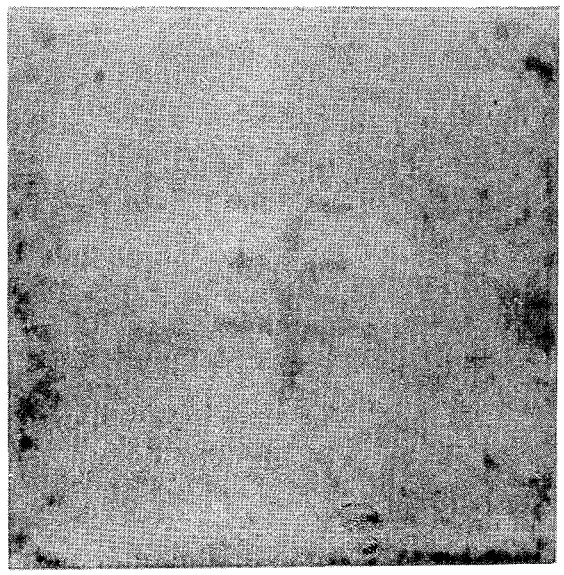

The resulting tile is shown in FIGURE 2 of the drawing. It will be noted that its glazed surface is non-uniform in color and that the designs formed by the overglaze are blurred and distorted. These considerations, in addition to the presence of glaze along the sides of the tile, clearly indicated that substantial glaze flow occurred during the firing stage. Further, upon closely viewing the glazed tile as formed by this conventional procedure, it was noted that the glazed surface had an extensive network of very fine craze lines thus suggesting poor adherence between the glaze and tile surface.

The foregoing specific disclosure is introduced solely to illustrate the broad nature of the present invention and has not been included as a limitation of the invention. While the invention has been described as employing an overglaze for providing designs which are primarily decorative or ornamental, the term "decorative design" is intended also to include descriptive material. Further, it will be apparent that the uncoated ceramic product may be first decorated by the first applied glaze slip or by other conventional means, with the overglaze or a single layer of glaze serving to accentuate or protect such decoration. To achieve a desired decorative effect, it will be apparent that the superimposed glazes which are employed differ in composition to provide glazed surfaces which differ in appearance; that is, in color, texture, opacity, gloss, etc.

It is to be understood that changes and modifications may be made without departing from the spirit and scope of the invention as defined in the claims which follow.

I claim:

1. A glaze slip for ceramic products which are to be fired consisting of a ceramic glaze composition and level-off D.P. cellulose in the form of small disintegrated aggregates of crystals in an aqueous medium consisting essentially of water, the glaze slip being further characterized by forming a gel when applied to uncoated ceramic products.

2. A glaze slip for ceramic products which are to be fired consisting of ceramic glaze-forming ingredients and level-off D.P. cellulose in the form of small disintegrated aggregates of crystals in an aqueous medium consisting essentially of water which serves as a binder for said glaze-forming ingredients, the glaze slip being further characterized by forming a gel which remains stable when applied to uncoated ceramic products and until the aggregates are burned-off during subsequent firing of the ceramic products at elevated temperatures.

3. A glaze slip as defined in claim 2 wherein the aggregates range from less than one micron to 200 to 300 microns in size.

4. A glaze slip as defined in claim 2 wherein the aggregates are present in an amount sufficient to bind the glaze-forming ingredients into a coherent mass when the slip is applied to the uncoated ceramic products.

5. A method of providing a ceramic product with a smooth, adherent, continuous glazed surface which comprises applying onto an uncoated surface of the ceramic product a glaze slip consisting of a ceramic glaze composition and level-off D.P. cellulose particles dispersed within an aqueous medium, subjecting the slip coated ceramic product to elevated temperatures to burn-off the cellulose particles and fuse the glaze composition onto the ceramic product as a smooth, continuous surface, and cooling the ceramic product.

6. A method as defined in claim 5 wherein the uncoated ceramic product is formed of clay which has been fired.

7. A method as defined in claim 5 wherein the uncoated ceramic product is formed of clay in an unbaked but dry condition.

8. A method of providing a ceramic product with a decorative glazed surface which comprises applying onto an uncoated surface of the ceramic product a glaze slip consisting of a ceramic glaze composition and level-off D.P. cellulose particles dispersed within an aqueous medium, allowing the applied glaze slip to gel, decorating the slip coated surface of the ceramic product with a second glaze slip and firing the slip coated ceramic product.

9. A method of providing a ceramic product with a decorative glazed surface which comprises applying onto an uncoated surface of the ceramic product a glaze slip consisting of a ceramic glaze composition and level-off D.P. cellulose particles dispersed within an aqueous medium, allowing the applied glaze slip to gel, decorating the slip coated surface of the ceramic product with a second glaze slip consisting of a ceramic glaze composition and level-off D.P. cellulose particles dispersed within an aqueous medium, allowing the second applied glaze slip to gel, firing the slip coated ceramic product, and tempering the fired ceramic product, said glaze compositions being of different formulation whereby the separate glaze slips provide the fired ceramic product with glazed surfaces of different character.

10. A method as defined in claim 9 wherein the ingredients of the respective glaze compositions differ to provide the fired ceramic product with glazed surfaces of different color, and wherein the cellulose aggregates are present in amounts sufficient to bind the ingredients of the respective glaze slips into coherent gelled masses when they are applied to the ceramic product.

11. A method as defined in claim 9 wherein the ingredients of the respective glaze compositions differ to provide the fired ceramic product with glazed surfaces differing in appearance, and wherein the cellulose aggregates are present in amounts sufficient to bind the ingredients of the respective glaze slips into coherent gelled masses when they are applied to the ceramic product.

12. A method of providing a ceramic product with a decorative glazed surface which comprises applying onto an uncoated surface of the ceramic product a glaze slip consisting of a ceramic glaze composition and level-off D.P. cellulose particles dispersed within an aqueous medium, firing the slip coated ceramic product to burn-off the celloluse particles and fuse the glaze composition, cooling the glazed ceramic product, decorating the glazed surface of the ceramic product with a second glaze slip and again firing the ceramic product.

13. A method as defined in claim 12 wherein the second glaze slip consists of a ceramic glaze composition and level-off D.P. cellulose particles dispersed within an aqueous medium, and wherein said glaze compositions contain different ingredients to provide the fired ceramic article with glazed surface differing in appearance.

References Cited by the Examiner

UNITED STATES PATENTS

| | | | |
|---|---|---|---|
| 2,318,803 | 5/43 | Schneider | 106—48 |
| 2,526,299 | 10/50 | Tinsely | 106—48 |
| 2,587,152 | 2/52 | Harlan et al. | 117—70 |
| 2,772,182 | 11/56 | Jessen | 117—70 |
| 2,978,446 | 4/61 | Bastista et al. | 117—166 |
| 3,089,782 | 5/63 | Bush et al. | 117—40 |

FOREIGN PATENTS

| | | |
|---|---|---|
| 874,945 | 8/61 | Great Britain. |

OTHER REFERENCES

Knapp: "Glaze Binders," Am. Ceramic Soc. Bull., vol. 33, pp. 11–12 (1954).

RICHARD D. NEVIUS, *Primary Examiner.*

UNITED STATES PATENT OFFICE
CERTIFICATE OF CORRECTION

Patent No. 3,211,575                          October 12, 1965

Henry S. Bondi

It is hereby certified that error appears in the above numbered patent requiring correction and that the said Letters Patent should read as corrected below.

Column 2, line 17, for "oveglaze" read -- overglaze --; column 3, line 1, for "dispersion.." read -- dispersion. --; line 49, for "formation" read -- formulation --; line 51, for "particularly" read -- particular --; line 55, after "slips" insert a comma; same line 55, for "englobe" read engobe --; line 58, for "dripping" read -- dipping --; column 5, line 19, for "city" read -- City --; line 40, for "200° F." read -- 2000° F. --; column 8, line 2, for "celloluse" read -- cellulose --; line 19, for "Bastista" read -- Battista --.

Signed and sealed this 21st day of June 1966.

(SEAL)
Attest:

ERNEST W. SWIDER
Attesting Officer

EDWARD J. BRENNER
Commissioner of Patents